United States Patent [19]

Chyz et al.

[11] Patent Number: 4,516,957
[45] Date of Patent: May 14, 1985

[54] TRIPOT JOINT WITH SPIDER RETAINER

[75] Inventors: George W. Chyz, Grosse Pointe Woods; David J. McGregor, Saginaw, both of Mich.

[73] Assignee: General Motors Corporation, Detroit, Mich.

[21] Appl. No.: 601,609

[22] Filed: Apr. 18, 1984

[51] Int. Cl.³ ............................................. F16D 3/30
[52] U.S. Cl. .................................... 464/111; 464/123; 464/905
[58] Field of Search ............... 285/DIG. 22; 403/143, 403/326; 464/111, 120, 122, 123, 124, 146, 901, 905, 906

[56] References Cited

U.S. PATENT DOCUMENTS

| | | | |
|---|---|---|---|
| 3,029,617 | 4/1962 | Marquis et al. | 464/123 |
| 3,032,229 | 5/1962 | Schoepe et al. | 285/DIG. 22 X |
| 3,367,139 | 2/1968 | Ristau | 464/906 X |
| 3,609,994 | 10/1971 | Colletti et al. | 464/122 X |
| 3,745,789 | 7/1973 | Orain | 464/111 |
| 3,875,762 | 4/1975 | Tampalini | 464/146 |
| 3,922,011 | 11/1975 | Walters | 403/326 X |
| 4,083,202 | 4/1978 | Westercamp | 464/111 X |
| 4,196,598 | 4/1980 | Hirai et al. | 464/111 |
| 4,320,632 | 3/1982 | Dore | 464/111 |

Primary Examiner—Stuart S. Levy
Assistant Examiner—Daniel P. Stodola
Attorney, Agent, or Firm—Charles R. White

[57] ABSTRACT

A tripot type universal joint having a spider assembly retained therein by an annular resilient spring wire retainer having small diameter segments mounted in an internal retention groove in the housing, the spider assembly has offset large diameter access segments disposed externally of the housing and adjacent to one end thereof and ramp portions interconnecting the large and small diameter segments which block internal drive channels in the housing in which drive rollers of the spider assembly are mounted to prevent the inadvertent removal of the spider assembly from the housing.

4 Claims, 4 Drawing Figures

U.S. Patent     May 14, 1985     4,516,957
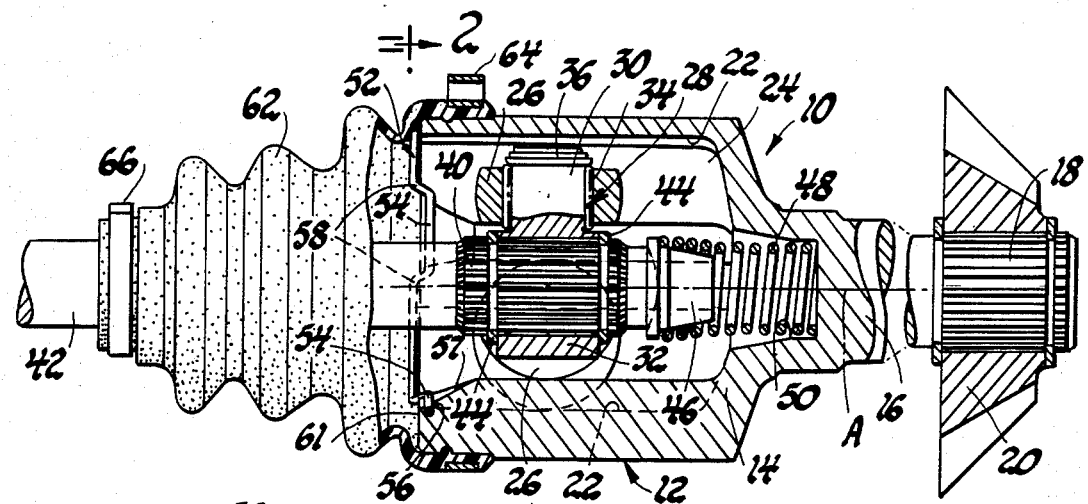
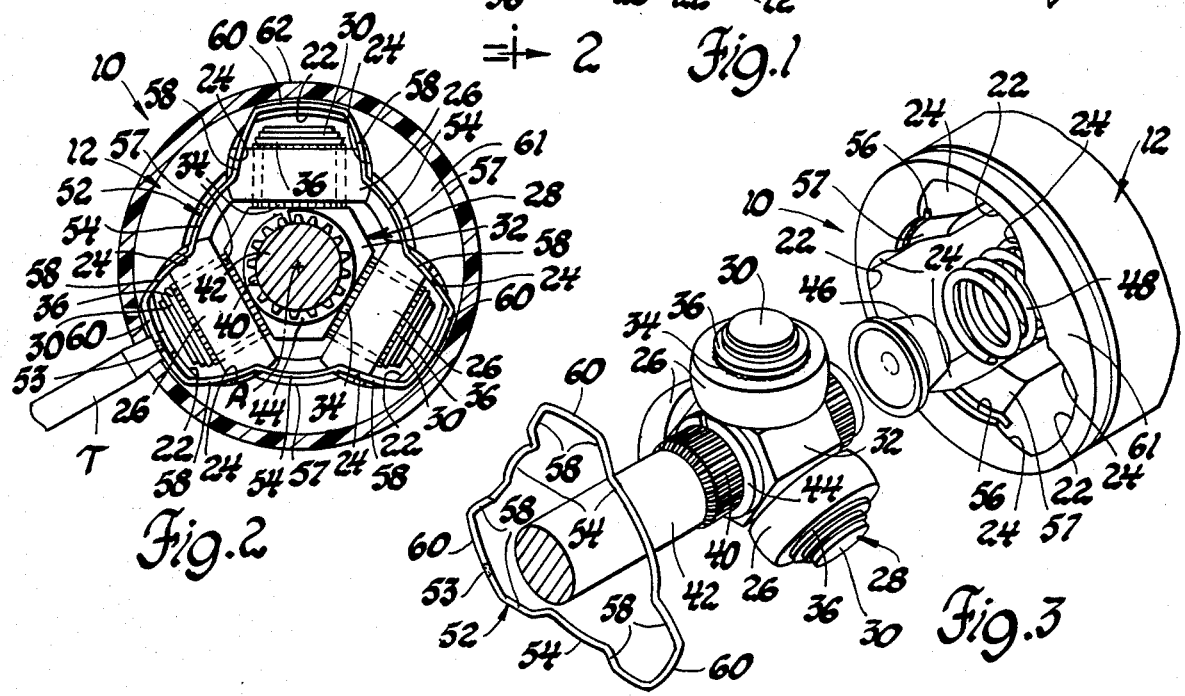

TRIPOT JOINT WITH SPIDER RETAINER

This invention relates to universal joints and more particularly to a new and improved tripot type universal joint incorporating a hooped spring retainer for the selectively releasable retention of the spider assembly of the joint within the housing thereof.

The U.S. Pat. No. 4,083,202 to Kenneth L. Westercamp for Stroking Universal Joint Housing discloses a tripot type universal joint with a cylindrical sheet metal cover fixed around the exterior of an outer drive housing. This cover is formed with a plurality of inwardly extending radial tabs having terminal ears axially extending into the interior of the housing to retain intermediate drive rollers of the joint spider assembly within the drive channels of the drive housing. The present invention is of this general type but has new and improved selectively releasable internal spring retention of the spider assembly in the tripot housing to maintain integrity of the assembly for part handling, shipping and subsequent assembly into the vehicle. With this improved retention, there is improved serviceability of the joint.

The spider retainer of this invention is an economical, lightweight, resilient component fabricated from hard drawn carbon steel spring wire or other suitable spring wire material. The wire is curved into a generally circular hoop and the free ends preferably butt welded together. The hooped spring retainer has three arcuately spaced small diameter retention segments which are adapted to fit within a segmented retainer groove formed in a coned internal surface of the tripot housing. The resilient spring retainer also has three arcuately spaced large diameter access segments, axially offset from the retention segments by blocker steps or ramps, that are adjacent to the outer axial face of the tripot housing to provide convenient structure which can be manually gripped when installing and removing the retainer.

Such installation and removal can be readily accomplished entirely by hand or with simple tools. The steps or ramps interconnecting the retention segments with the access segments extend along the sides of the drive channels in the tripot housing and adjacent to the ends thereof to form positively located and firmly fixed stops that are physically encountered by the rollers of the spider assembly at the outer extent of their travel to prevent inadvertent withdrawal of the spider assembly from the housing. With the retainer of this invention a single retainer unit may repeatedly be removed from and reinstalled in the tripot housing without any permanent deformation of the retainer or metal fatigue thereof. After removal, the spider assembly can be axially withdrawn for inspection and repair.

With the spring retainer in place, the spider assembly has sufficient retention to permit disconnection of the tripot joint from a transmission output such as the differential side gear. The spring retainer does not interfere with boot seal mounting to the joint housing or add any material bulk or weight to the joint as is the case with various prior constructions. The spring retainer of this invention does not materially interfere with any operation of the joint and can be readily used in a wide variety of housings including those having external lobes or scallops.

It is a further feature, object and advantage of this invention to provide a new and improved internally mounted spring retainer for maintaining a spider assembly in a tripot housing with sufficient retention to allow the housing and the spider assembly therein to be removed as a unit from drive connection with the transmission by applying axial removal force on the axle shaft.

Another feature, object and advantage of this invention is to provide a new and improved tripot with a hooped retainer of spring wire releasably internally mounted in the tripot housing for blocking the drive roller channels and thereby maintaining the spider assembly with minimized interference with the geometric capabilities including the stroke angle joint of the assembly.

It is another feature, object and advantage of this invention to provide a new and improved tripot joint having a wire spring retainer releasably mounted within the end of the housing thereof to retain the spider assembly therein which does not substantially add to the bulk or weight of the joint which is easy to repeatedly remove and reinstall with minimal tooling without any significant change in the retainer or its capability of retaining the spider assembly within the housing.

Another feature, object and advantage of this invention is to provide a new and improved wire spring retainer for use in a tripot joint for retaining the spider assembly and which has spring fit within a segmented groove in the housing and which is adapted to stop the rollers at their full out position without detracting from effective and efficient operation of the tripot during drive transmission.

The exact nature of this invention as well as other objects, features and advantages thereof will be readily apparent from consideration of the following specification and drawing in which:

FIG. 1 is an elevational view partially sectioned of a universal joint of a drive axle assembly which incorporates the preferred embodiment of this invention.

FIG. 2 is a sectional view partially broken away and taken substantially along lines 2—2 of FIG. 1 looking in the direction of the arrows.

FIG. 3 is an exploded isometric view of the universal joint of FIG. 1.

FIG. 4 is a view similar to FIG. 1 showing components of the universal joint moved from the FIG. 1 position to illustrate the retention of the spider without materially altering the stroke-angle capability of the joint assembly.

Referring now in greater detail to the drawings, FIG. 1 shows a portion of a vehicle drive axle including a sliding universal joint 10 of the tripot type having a generally cylindrical drive housing 12. The housing is closed at an inboard end by an end wall 14 and has a centralized drive shaft 16 integral with end wall 14 which extends axially therefrom into splined connection at 18 with a side gear 20 of a differential providing the output of an automatic or manual transmission. The drive housing 12 is open at its outer end and has three equally spaced and longitudinally extending drive channels 22 formed in the internal wall thereof which are concentric with the longitudinal axis A of the housing and of drive shaft 16 connected thereto. Each of the longitudinally extending channels is bounded by concave side walls 24 which form part spherical tracks that engage the corresponding curved surfaces of associated drive rollers 26 of a spider assembly 28. Each drive roller 26 is mounted on an associated trunnion 30 extending radially from a central hub 32 of the spider assembly. The rollers are mounted on the trunnions with a full complement of needle bearings 34 interposed between the inner diameter of the roller and the outer cylindrical surface of the associated trunnion 30. These drive rollers 26 are thus rotatable on trunnions 30 and are slidable with respect thereto in an axial direction to allow the universal stroking pivotal movement of a drive shaft when the vehicle is driven. Annular sheet metal retainers 36, secured to the outer end of each trunnion 30, retain the needle bearings in location and limit the radial outward movement of the associated roller on its trunnion. With the above construction, each drive roller is captured in radial direction in its associated drive channel and is maintained substantially equidistant from the longitudinal axis A during joint operation.

The hub 32 is splined internally for drive connection with the externally splined inboard end portion 40 of an elongated drive shaft 42 that extends into the open end of the drive housing 12. The spider hub is trapped in position on this splined end of the drive shaft by laterally spaced snap rings 44 seated in annular grooves formed in the splines of this drive shaft as shown in FIG. 1. The drive shaft 42 extends outwardly from hub 32 into drive connection with an outer universal joint, not shown, which is operatively connected to a road wheel assembly not illustrated. The innermost end of shaft 42 is convexly curved and has a spring seat 46 slidably mounted thereon as shown in FIGS. 1 and 4 that fits within the end of a helical centering spring 48. The other end of spring 48 is seated in a spring pocket 50 formed in the end wall 14 of housing 12.

To maintain the spider assembly 28 and the drive shaft 42 within housing 12, this invention has a new and improved spring retainer 52 formed from spring wire into a hoop preferably with the free ends butt welded or otherwise secured together at 53. The closed wire spring retainer 52 has three inwardly offset and small diameter locking segments 54 equally spaced which are adapted to fit into the segmented annular groove 56 cut or otherwise formed in the three coned or ramped inner camming wall 57 of the housing 12 between the equally spaced drive channels 22. Extending from the ends of these locking segments 54 are six outwardly inclined blocking steps or ramps 58. These six blocking steps respectively extend along the outer end of each of the six concave side walls 24 and effectively restrict the width of each channel 22 to prevent the removal of the spider assembly and the shaft from the housing by physical contact with the outer surface of the roller. The outer ends of these six blocking steps or ramps 58 are connected by three large diameter external arcuate access segments 60 which extend along the outer face 61 of the housing immediately above the drive channels 22. These access segments 60 provide gripping or prying structure slightly offset from the outer face 61 so that simple tooling T (illustrated in FIG. 2) can be inserted between the spring retainer and the housing and manipulated to deflect and snap the retainer out of the retaining groove to allow the spider assembly to be subsequently axially removed for inspection or repair. After such inspection or repair and reinstallation, the spring retainer can be deflected by manually gripping the access segments 60 and applying an axial force which results in the radial inward deflection of the locking segments by the conical camming walls 57 leading directly into the retainer groove 56. On reaching this groove, the locking segments deflect radially outwardly into seated locking engagement in the groove 56. The joint 10 is sealed by a convoluted elastomeric boot seal 62 having its inboard end secured by clamp 64 to the outer perimeter of the housing. The outboard end of the boot seal is secured by suitable clamping means 66 to the drive shaft 42. The spring retainer 52 does not interfere with the boot seal mounting to the housing 12.

With the retention provided by this invention, the wire spring retainer 52 provides sufficient retention to allow the housing tripot joint 10 to be removed from the transmission by axially pulling on the drive shaft 42 to effect disengagement of the splined end of the shaft 16 from the side gear of the differential. In addition, the retainer does not provide any material interference with the geometric capabilities or stroke angle of the joint assembly even when it is at maximum bend such as shown in FIG. 4. The spider assembly, the centering spring and other parts are easily serviceable since a person of ordinary skill can readily remove and reinstall the retainer. The retainer being of spring wire experience minimal fatigue and has long service life even when there are many teardowns of the joint. Since the spring retainer 52 retains the spider assembly by stopping the drive rollers in their full out position at a plurality of points there is new and improved retention to facilitate handling of an assembled joint and facilitating assembly into the vehicle. While the spring wire retainer has been shown in closed loop form, it may be formed with free ends. Furthermore, this invention can be employed in universal joints utilizing spherical balls rather than rollers. The housing can be open at both ends requiring spring retainers of this invention at both ends to block opposite ends of the drive channels.

The above invention should not be limited to particular details of construction shown and described for obvious modifications will occur to a person skilled in the art.

The embodiments of the invention in which an exclusive property or privilege is claimed are defined as follows:

1. In a universal joint having a centralized inner drive shaft, a drive assembly with a plurality of arcuately disposed drive elements operatively carried by said shaft, an outer drive housing disposed around said drive elements having an inner wall, a plurality of arcuately spaced drive channels in said inner wall of said housing, each of said drive elements being rotatably mounted with respect to said drive shaft and respectively disposed in said drive channels of said housing, the improvement comprising a curved resilient spring wire retainer, a retainer groove formed in said wall of said housing, said retainer having first segments releasably mounted within said retainer groove, said wire retainer further having blocker steps at the ends of the ends of said first segments projecting into the ends of said drive channels to reduce the effective width thereof to prevent the withdrawal of said drive elements and said inner drive shaft from drive connection with said drive housing and large diameter access segments interconnecting each of the blocker steps and extending externally of the housing and adjacent to one end thereof to provide external structure facilitating deflection of said retainer for the removal thereof from said groove and said housing and for the installation of said retainer into said groove and said housing.

2. The universal joint of claim 1 wherein said housing has camming surfaces in said inner wall thereof tapering inwardly toward said retainer groove to cam the retainer inwardly on the insertion of said spring wire retainer into said housing for subsequent retention by said retainer groove.

3. In a stroking universal joint having an inner drive spider assembly with a plurality of circumferentially spaced radial trunnions and an outer drive housing member having an interior wall surrounding said spider assembly, first shaft means drivingly connected to said housing member, second shaft means drivingly connected to said spider assembly, a plurality of elongated drive channels in said interior wall of said housing member, each of said trunnions having an intermediate drive roller rotatably mounted thereon and respectively disposed for linear travel in an associate one of said drive channels, the improvement comprising a retention groove in the interior wall of said housing member, a resilient spring wire retainer formed into an annular configuration, said retainer having first small diameter segments releasably mounted within said groove, said retainer having blocker steps at the ends of the ends of said first segments extending in the ends of said drive channels to reduce the effective width thereof to contact said drive rollers to prevent the withdrawal of said spider assembly from said drive housing and second large diameter access segments interconnecting each of the blocker steps extending externally of the housing and adjacent to one end thereof to provide external structure facilitating deflection of said retainer for the removal of the retainer from said retention groove from said housing and for the installation of said retainer into said retainer groove and said housing.

4. In a stroking universal joint having first and second drive shaft means, an inner drive spider assembly drivingly connected to one of said shaft means and having a plurality of arcuately spaced circumferentially spaced radial trunnions, an outer drive housing operatively connected to the other of said drive shaft means, said housing having an interior wall defining a chamber for receiving said spider assembly, at least one end of said housing being open, a plurality of arcuately spaced drive channels in said interior wall of said housing, each of said trunnions having an intermediate drive roller rotatably mounted thereon and disposed in an associated one of said drive channels of said outer drive member, the improvement comprising a segmented groove formed in said interior wall, said interior including ramped camming walls leading into said segmented groove, a spring wire retainer formed into an annular configuration, said retainer having first arcuate portions releasably mounted within said segmented groove and having blocker steps at the ends of the ends of said first arcuate portions extending a terminal end of each of said drive channels associated therewith to reduce the effective width thereof to contact said rollers to prevent the withdrawal of said spider assembly from said drive housing and large diameter access segments interconnecting each of the blocker steps extending externally of the housing and adjacent to one end thereof to provide external structure facilitating removal of the retainer from said segmented groove and said housing and the constriction of said retainer by said camming wall when inserted to said housing for the installation of said retainer into said segmented groove.

* * * * *